United States Patent
Hardee et al.

(10) Patent No.: US 10,417,408 B2
(45) Date of Patent: Sep. 17, 2019

(54) TACTILE-BASED PASSWORD ENTRY

(71) Applicant: INTERNATIONAL BUSINESS MACHINES CORPORATION, Armonk, NY (US)

(72) Inventors: Christopher J. Hardee, Raleigh, NC (US); Steven R. Joroff, Tokyo (JP); Pamela A. Nesbitt, Ridgefield, CT (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 245 days.

(21) Appl. No.: 15/455,456

(22) Filed: Mar. 10, 2017

(65) Prior Publication Data
US 2018/0260555 A1   Sep. 13, 2018

(51) Int. Cl.
*G06F 21/00* (2013.01)
*G06F 21/36* (2013.01)
*G06F 3/01* (2006.01)
*G06F 3/0488* (2013.01)

(52) U.S. Cl.
CPC ............. *G06F 21/36* (2013.01); *G06F 3/016* (2013.01); *G06F 3/04883* (2013.01); *G06F 2203/014* (2013.01); *G06F 2203/04809* (2013.01)

(58) Field of Classification Search
None
See application file for complete search history.

(56) References Cited

U.S. PATENT DOCUMENTS

| | | | |
|---|---|---|---|
| 7,593,000 B1 | 9/2009 | Chin | |
| 8,536,978 B2 | 9/2013 | Coggill | |
| 10,013,546 B1 * | 7/2018 | Johansson | G06F 21/36 |
| 2002/0104005 A1 | 8/2002 | Yin et al. | |

(Continued)

OTHER PUBLICATIONS

Toennies et al., "Toward Haptic/Aural Touchscreen Display of Graphical Mathematics for the Education of Blind Students", 2011, IEEE World Haptics Conference. p. 373-378.*

(Continued)

*Primary Examiner* — Jeffery L Williams
(74) *Attorney, Agent, or Firm* — Cantor Colburn LLP; David Zwick

(57) ABSTRACT

Systems, methods, and computer program products are disclosed for authenticating access to a user device using tactile-based feedback provided to a user of the device. A user device may include a display layer and a tactile layer. The user device may be configured to selectively activate portions of the tactile layer to cause opposing regions of a surface of the display layer to become raised relative to other regions of the display surface. A user may be required to specify a sequence of directional movements corresponding to a correct passcode pattern by traversing a path along the raised regions. The particular arrangement of raised regions may change each time access to the user device is requested by activating different portions of the tactile layer, thereby giving the appearance to a third party that a different passcode pattern is being entered each time, and thus, minimizing likelihood of unauthorized passcode detection.

6 Claims, 4 Drawing Sheets

(56) References Cited

U.S. PATENT DOCUMENTS

| | | | |
|---|---|---|---|
| 2006/0174339 A1* | 8/2006 | Tao | G06F 21/36 726/18 |
| 2008/0098464 A1* | 4/2008 | Mizrah | G06F 21/36 726/5 |
| 2008/0184360 A1 | 7/2008 | Kornilovsky et al. | |
| 2008/0235788 A1* | 9/2008 | El Saddik | G06F 21/36 726/18 |
| 2011/0184824 A1* | 7/2011 | George | G01D 5/39 705/24 |
| 2011/0242009 A1* | 10/2011 | Gray | G06F 1/1626 345/173 |
| 2011/0260829 A1 | 10/2011 | Lee | |
| 2012/0159613 A1* | 6/2012 | Griffin | G06F 21/36 726/19 |
| 2014/0020088 A1* | 1/2014 | Bell | G06F 21/36 726/19 |
| 2014/0054370 A1* | 2/2014 | Jenkins | G07F 19/201 235/379 |
| 2014/0115670 A1* | 4/2014 | Barton | H04L 9/3228 726/4 |
| 2015/0205353 A1* | 7/2015 | Feng | G06F 3/016 345/173 |
| 2015/0268768 A1* | 9/2015 | Woodhull | G06F 3/0418 345/168 |
| 2015/0331528 A1* | 11/2015 | Robinson | G09B 21/004 345/173 |
| 2016/0125375 A1* | 5/2016 | Magee | G07F 19/201 705/43 |
| 2016/0188865 A1* | 6/2016 | Tao | G06F 21/36 726/19 |
| 2017/0132404 A1* | 5/2017 | Tao | G06F 21/36 |
| 2017/0140354 A1* | 5/2017 | Jenkins | G07F 19/201 |
| 2017/0336903 A1* | 11/2017 | Rivaud | G06F 3/0416 |
| 2018/0096126 A1* | 4/2018 | Bell | G06F 21/36 |
| 2018/0197157 A1* | 7/2018 | Magee | G06F 3/1423 |
| 2018/0260555 A1* | 9/2018 | Hardee | G06F 21/36 |

OTHER PUBLICATIONS

Tao, Hai, "Pass-Go, a New Graphical Password Scheme", Jun. 2006, University of Ottawa, p. 1-100.*

Deluca et al., "PassShape: stroke based shape passwords" Proceedings of the 19th Australasian Conference on Computer—Human interaction: Entertaining User interfaces. ACM, 2007, pp. 239-240.

Dunphy et al., . "Do background images improve draw a secret graphical passwords?" Proceedings of the 14th ACM conference on Computer and communications security. ACM, 2007, pp. 36-47.

Kuber et al., . "Feasibility study of tactile-based authentication." International Journal of Human-Computer Studies 68.3 (2010): 158-181.

Vianu Kumar et al; "Reducing Shoulder-surfing by Using Gaze-based Password Entry"; Proceedings of the 3rd symposium on Usable privacy and security. ACM, 2007, pp. 13-19.

Tan et al., "Spy-Resistant Keyboard: Towards More Secure Password Entry on Publicly Observable Touch Screens." Proceedings of OZCHI-Computer-Human Interaction Special Interest Group (CHISIG) of Australia. Canberra, Australia: ACM Press. 2005.

* cited by examiner

TACTILE-BASED PASSWORD ENTRY

BACKGROUND

The present invention relates generally to controlling access to computing systems, and more specifically, to systems, methods, and computer program products that provide tactile-based password entry capabilities.

A variety of types of authentication mechanisms are known for restricting and authenticating access to a service, system, or device. These authentication mechanisms may include username and password combinations, authentication tokens, authentication pins, passcode patterns produced via touch input, or the like. The aforementioned types of authentication mechanisms, however, suffer from a number of drawbacks, technical solutions to which are described herein.

SUMMARY

In one or more example embodiments of the invention, a computer-implemented method for authenticating access to a user device is disclosed. The method includes receiving input at the user device indicative of a request to access the user device. The method further includes providing a tactile output at one or more regions of a surface of a display of the user device, and receiving touch input at the display of the user device, where the touch input coincides with at least a portion of the one or more regions of the display at which the tactile output is provided. The method additionally includes determining that the touch input matches a stored passcode pattern, and authenticating access to the user device based at least in part on the touch input matching the stored passcode pattern.

In one or more other example embodiments of the invention, a system for authenticating access to a user device is disclosed. The system includes at least one memory storing computer-executable instructions and at least one processor configured to access the at least one memory and execute the computer-executable instructions to perform a set of operations. The system may include a user device alone or a user device and one or more servers executing respective functionality in a distributed fashion. The operations include receiving input at the user device indicative of a request to access the user device. The operations further include providing a tactile output at one or more regions of a surface of a display of the user device, and receiving touch input at the display of the user device, where the touch input coincides with at least a portion of the one or more regions of the display at which the tactile output is provided. The operations additionally include determining that the touch input matches a stored passcode pattern, and authenticating access to the user device based at least in part on the touch input matching the stored passcode pattern.

In one or more other example embodiments of the invention, a computer program product for authenticating access to a user device is disclosed that includes a non-transitory storage medium readable by a processing circuit, the storage medium storing instructions executable by the processing circuit to cause a method to be performed. The method includes receiving input at the user device indicative of a request to access the user device. The method further includes providing a tactile output at one or more regions of a surface of a display of the user device, and receiving touch input at the display of the user device, where the touch input coincides with at least a portion of the one or more regions of the display at which the tactile output is provided. The method additionally includes determining that the touch input matches a stored passcode pattern, and authenticating access to the user device based at least in part on the touch input matching the stored passcode pattern.

BRIEF DESCRIPTION OF THE DRAWINGS

The detailed description is set forth with reference to the accompanying drawings. The drawings are provided for purposes of illustration only and merely depict example embodiments of the invention. The drawings are provided to facilitate understanding of the invention and shall not be deemed to limit the breadth, scope, or applicability of the invention. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
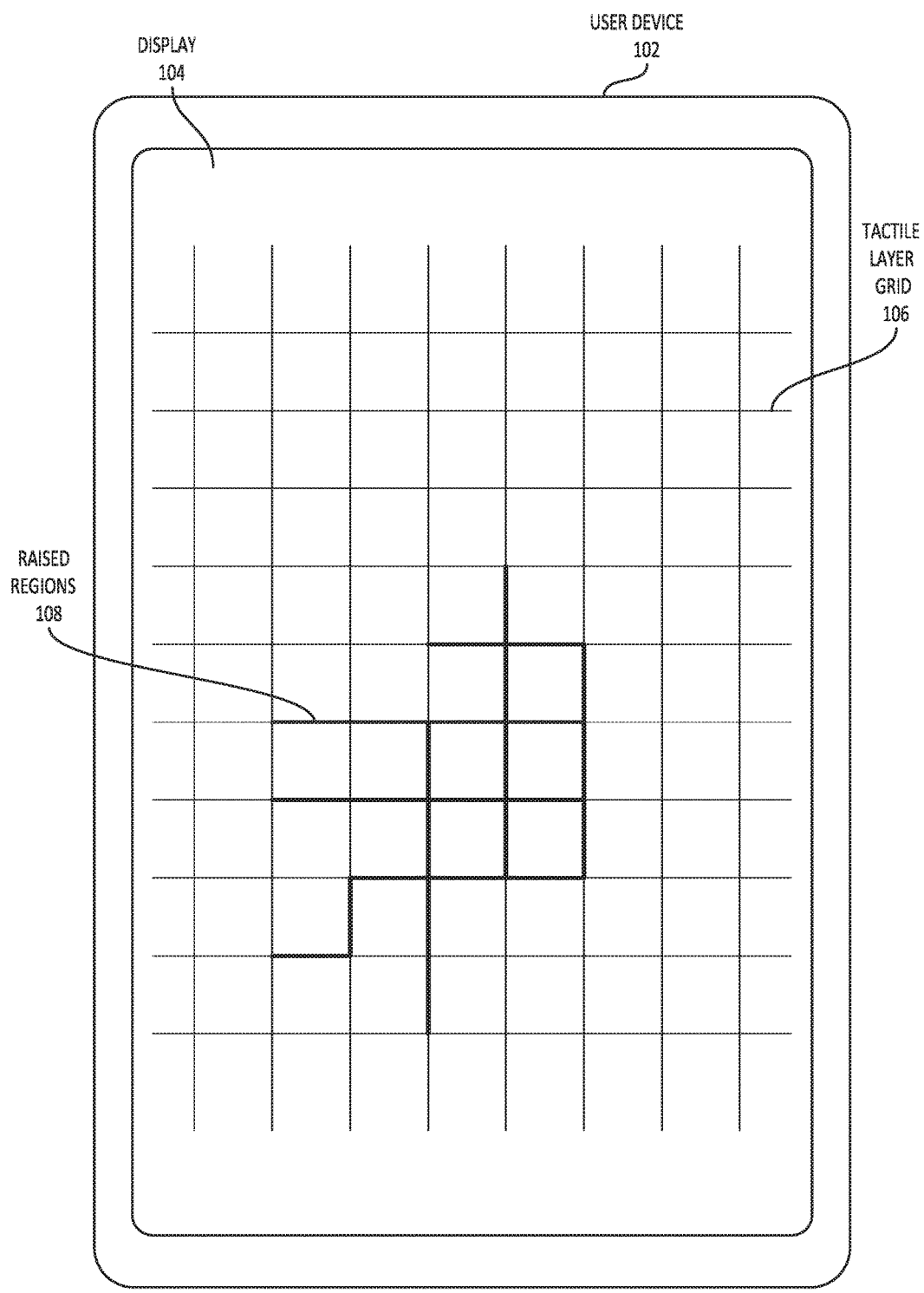
FIG. 1 is a schematic diagram that illustrates raised regions of a user device display surface that correspond to portions of a tactile layer grid in accordance with one or more example embodiments of the invention.

Example embodiments of the invention include, among other things, systems, methods, computer-readable media, techniques, and methodologies for authenticating access to a user device using tactile-based feedback provided to a user of the user device. In example embodiments, a user device may include, among other things, a display layer and a tactile layer. The tactile layer may be disposed beneath the display layer in the user device. The user device may be configured to selectively activate portions of the tactile layer to cause opposing regions of a surface of the display layer to become raised relative to other regions of the display surface. In certain example embodiments, the tactile layer may include a tactile layer grid composed of a plurality of intersecting grid lines. Selectively activating portions of the tactile layer may include activating two or more intersecting grid lines of the tactile layer grid to cause regions of the display surface that coincide with the activated grid lines to become raised. Portions of the tactile layer (e.g., at least a portion of a grid line of the tactile layer grid) may be activated by an electrical signal, a magnetic signal, or the like.

In example embodiments, a user may provide input to a user device indicative of a desired passcode pattern. The input may be in the form of a sequence of directional movements. The directional movements may include a straight line movement, a directional left movement, a directional right movement, or the like. An example sequence of directional movements may be as follows: straight, left, straight, right, left. The specified sequence of directional movements may further include an indication of a number of intersections of the tactile layer grid that are passed for each straight line movement. In addition, in certain example embodiments, a reverse directional movement may be permitted in which a user may again traverse the tactile layer grid along a portion that was previously traversed earlier in the sequence of directional movements.

In certain example embodiments, the user may provide text-based input, voice input, or the like indicative of the desired sequence of directional movements. In other example embodiments, if a user wishes to input a desired passcode pattern, the user device may activate the entire tactile layer grid to cause regions of the display surface that coincide with grid lines of the tactile layer grid to become raised. The user may then provide touch input to the display that traverses a path along the raised surfaces that is indicative of the desired passcode pattern. The traversed path may include a sequence of directional movements that correspond to a unique traversal along the grid lines of a portion of the tactile layer grid.

In certain example embodiments, a straight line movement may require traversing past at least one intersection of grid lines of the tactile layer grid. For instance, assuming that a directional right or a directional left is taken at a particular grid line intersection, the path may be required to subsequently traverse past at least one grid line intersection in order to be interpreted as including a straight line movement. In other words, traversal along a particular grid line may not be considered a straight line movement unless at least one grid line intersection is traversed prior to making a directional right or a directional left movement. Further, in certain example embodiments, the traversal may cross itself at one or more locations. More specifically, the path traversed by the user may cross the same position on a raised region of the surface of the display more than once.

It should be appreciated that while the terms "directional right" and "directional left" are used herein, any of a variety of directional changes may be possible. Accordingly, the term "directional right" may refer to any directional deviation in a rightward direction from a grid line currently being traversed that occurs at a grid line intersection. Similarly, the term "directional left" may refer to any directional deviation in a leftward direction from a grid line currently being traversed that occurs at a grid line intersection.

Once the user traverses the path indicative of the desired passcode pattern, the user device may store the sequence of directional movements that make up the traversed path as the passcode pattern that will be used to authenticate access to the user device. Subsequently, when a user wishes to access the user device, the user may be required to input a pattern that matches the stored passcode pattern.

Upon receiving input from a user indicative of a desire to enter a passcode pattern to gain access to a user device, a portion (or all) of the tactile layer grid may be activated to cause opposing regions of the display surface to become raised. In certain example embodiments, the raised regions of the display surface may permit a touch-based traversal that corresponds to the correct passcode pattern as well as any number of incorrect traversals. The user may begin entry of the passcode pattern (i.e. initiate the path traversal) at any point within the raised regions of the display surface, and may be required to remain on the raised regions throughout the complete traversal. In certain example embodiments, depending on where the user initiates the traversal, there may not be enough display real estate to permit entry of the complete passcode pattern, in which case, the device may instruct the user to again attempt entry of the passcode pattern.

Referring to passcode pattern entry in more detail, the user may select a position on a raised region of the display surface to initiate entry of the passcode pattern. The user may then traverse a path along the raised regions of the display surface that includes a sequence of directional movements, as noted above. The raised regions of the display surface may include raised intersections that correspond to intersections of grid lines in the tactile layer grid. At each such raised intersection, the user may be required to make a decision as to whether to make a straight line movement through the raised intersection, a left directional movement, or a right directional movement. Each such raised intersection may allow for the correct directional movement as well as any number of incorrect directional movements. For example, the correct directional movement at a raised intersection may be a left directional movement, but the raised regions of the display surface may also allow for a straight line directional movement, a right directional movement, and/or a reverse directional movement. The combination of the decisions made at each such raised intersection may determine whether the passcode being entered matches the previously generated passcode.

The user device may detect completion of passcode entry in any of a variety of ways. For example, after completing a path traversal representing an entered passcode, the user may provide some form of additional input (e.g., click a button) indicating that the passcode entry is complete. As another non-limiting example, cessation of touch input (e.g., the user removing her finger from the display surface) for more than a threshold period of time may be detected and interpreted as completion of the passcode entry.

After the passcode entry is completed, the user device may compare the entered passcode to the previously generated and stored passcode pattern that authenticates access to the user device. In particular, the user device may determine whether the sequence of directional movements present in the entered passcode matches the sequence of directional movements in the stored passcode. If a match is determined to exist, access to the user device may be granted. Alternatively, if the entered passcode does not match the stored passcode, access to the user device may be denied. In certain example embodiments, an exact match may be required for access to be granted. That is, the particular sequence of directional movements in the entered passcode may be required to exactly match the sequence of directional movements in the stored passcode. For example, if the stored passcode is straight, left, left, straight, right, then the entered passcode may be deemed a match if it contains the exact same sequence.

As previously noted, a straight line directional movement may require traversing at least one grid intersection. Moreover, in certain example embodiments, in order for a straight line directional movement in the entered passcode to be deemed a match to a straight line directional movement in the stored passcode, a number of traversed intersections in the entered passcode may be required to exactly match the number of traversed intersections in the stored passcode. For example, if a particular straight line movement in the stored passcode sequence traverses 3 grid intersections, a corresponding straight line movement in the entered passcode may also be required to traverse 3 grid intersections in order to be deemed a match.

In other example embodiments, a certain amount of deviation between the entered passcode and the stored passcode may be permitted for granting access to the user device. For example, if a number of directional movement mismatches between the sequence of directional movements in the stored passcode and the sequence of directional movements in the entered passcode satisfies a threshold value, access to the user device may be granted. Depending on the implementation, a first value may be deemed to satisfy a second value if the first value is greater than or equal to the second value or if the first value is less than or equal to the second value.

In other example embodiments, in addition to or as an alternative to providing a tolerance for directional movement mismatches, the user may be permitted to correct mistakes in passcode entry up to some maximum number of times. The user may correct a passcode entry mistake by reversing course along the path being traversed until a grid intersection is reached at which position the user may make a different directional movement than what was previously made. In certain example embodiments, the user may first provide input to the user device indicating a desire to correct a mistake prior to reversing course so as to prevent the user device from interpreting the directional reversal as a continuation of the path being traversed.

Example embodiments of the invention provide various technical features, technical effects, and/or improvements to technology. For instance, example embodiments of the invention provide the technical effect of reduced likelihood of passcode detection by an unauthorized third party by providing a tactile-based authentication mechanism that allows a user to input a same passcode pattern to authenticate access to a user device using a different configuration of tactile feedback to the user each time access is requested. Conventional touch-based passcode authentication mechanisms require selection of a correct sequence of numerical digits or a correct path traversal in order to gain access to a device. However, in such conventional touch-based passcode authentication mechanisms, the numerical digits or the vertices used to draw a traversal pattern are always rendered at fixed locations. As a result, such conventional mechanisms are vulnerable to third party passcode detection because the unauthorized third party may simply observe the sequence of digits inputted or the path that is traversed, which never changes. In addition, so-called "smudge attacks" are becoming more common in which fingerprint smudges on the display of the user device are used to identify passcodes or passcode patterns that were previously inputted.

Example embodiments of the invention provide significant improvements to the functioning of a computer with respect to device authentication because they are significantly less vulnerable than conventional device authentication mechanisms to unauthorized passcode detection. This is due, at least in part, to the technical effect produced by the technical features associated with providing a different configuration of tactile feedback to the user each time access is requested. As a result, the passcode pattern being entered may appear different each time. That is, based on the tactile feedback that is provided, the user may be permitted to initiate passcode entry at a different location on the display each time, giving the appearance that a different passcode is being entered each time. Because the actual path traversed on the display may differ each time the passcode is entered depending on the particular arrangement of grid lines that are activated, example embodiments of the invention are significantly less vulnerable to smudge attacks. Further, an unauthorized third party may be unable to visually determine which regions of the display surface are raised (as this may only be determined from contacting the display), making passcode detection more difficult. For example, regions of the display that oppose non-activated portions of a tactile layer grid may be illuminated or otherwise made detectable even though such regions of the display are not raised. This may further obfuscate detection of the correct passcode pattern, which may be required to be traversed only on raised regions of the display surface.

In addition, because example embodiments of the invention rely on tactile feedback the user to guide passcode entry (e.g., raising select regions of the display surface using an underlying tactile layer grid), passcode patterns may be entered without looking at the display of the user device such as, for example, while the device is in a user's pocket or otherwise obscured from view of a potential third party. This further decreases the likelihood of unauthorized passcode detection.

More specifically, in certain example embodiments, the technical effect of reduced likelihood of unauthorized passcode detection and the corresponding improvement to computer-based device authentication technologies can be achieved, for example, by the technical feature of activating a different combination of grid lines of a tactile layer grid each time access to a user device is requested, thereby causing different regions of the display surface to become raised. A user may be permitted to initiate passcode entry at any position within the raised regions of the display surface, and may be granted access as long as the pattern that is entered includes the correct sequence of directional movements along the raised regions of the display surface. Because, however, the raised regions of the display surface may change each time access to the user device is requested, the passcode that is being entered may appear different to a third party each time it is entered even though it includes the correct sequence of directional movements.

The above-mentioned technical effects and improvements to computer technology may be further achieved, at least in part, by the requirement in certain example embodiments that a correct straight line movement traverse the correct number of raised intersections. Thus, even if an unauthorized third party observes the sequence of directional movements of the passcode pattern, it would be difficult for the third party to replicate the correct passcode pattern because the third party would likely be unaware of the number of raised intersections that need to be traversed for each straight line movement.

It should be appreciated that the above examples of technical features, technical effects, and improvements to the functioning of a computer and computer technology provided by example embodiments of the invention are merely illustrative and not exhaustive.

Example Embodiments

Figure 2A:
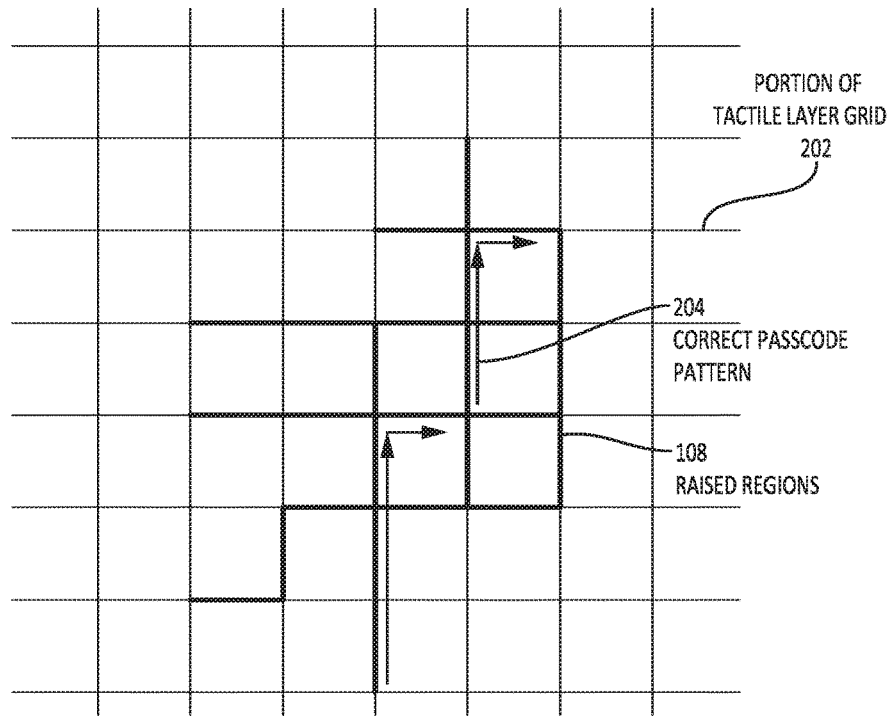
FIG. 2A is a schematic diagram that illustrates touch input provided to a user device that is representative of a correct sequence of tactile-based directional movements associated with a passcode pattern for authenticating access to the user device in accordance with one or more example embodiments of the invention.
Figure 2B:
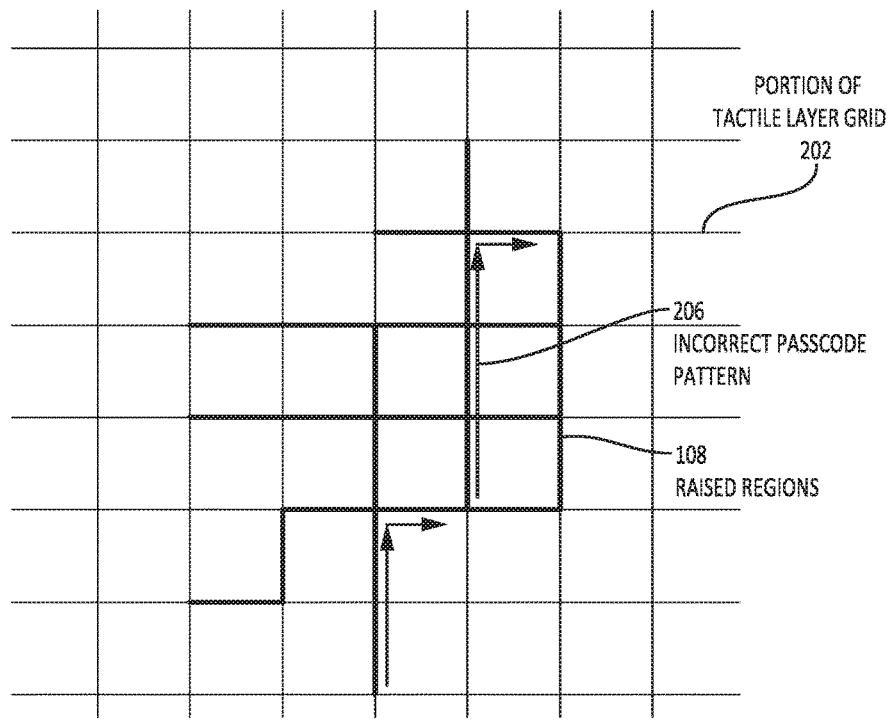
FIG. 2B is a schematic diagram that illustrates touch input provided to a user device that is representative of an incorrect sequence of tactile-based directional movements that does not match a passcode pattern for authenticating access to the user device in accordance with one or more example embodiments of the invention.
Figure 3:
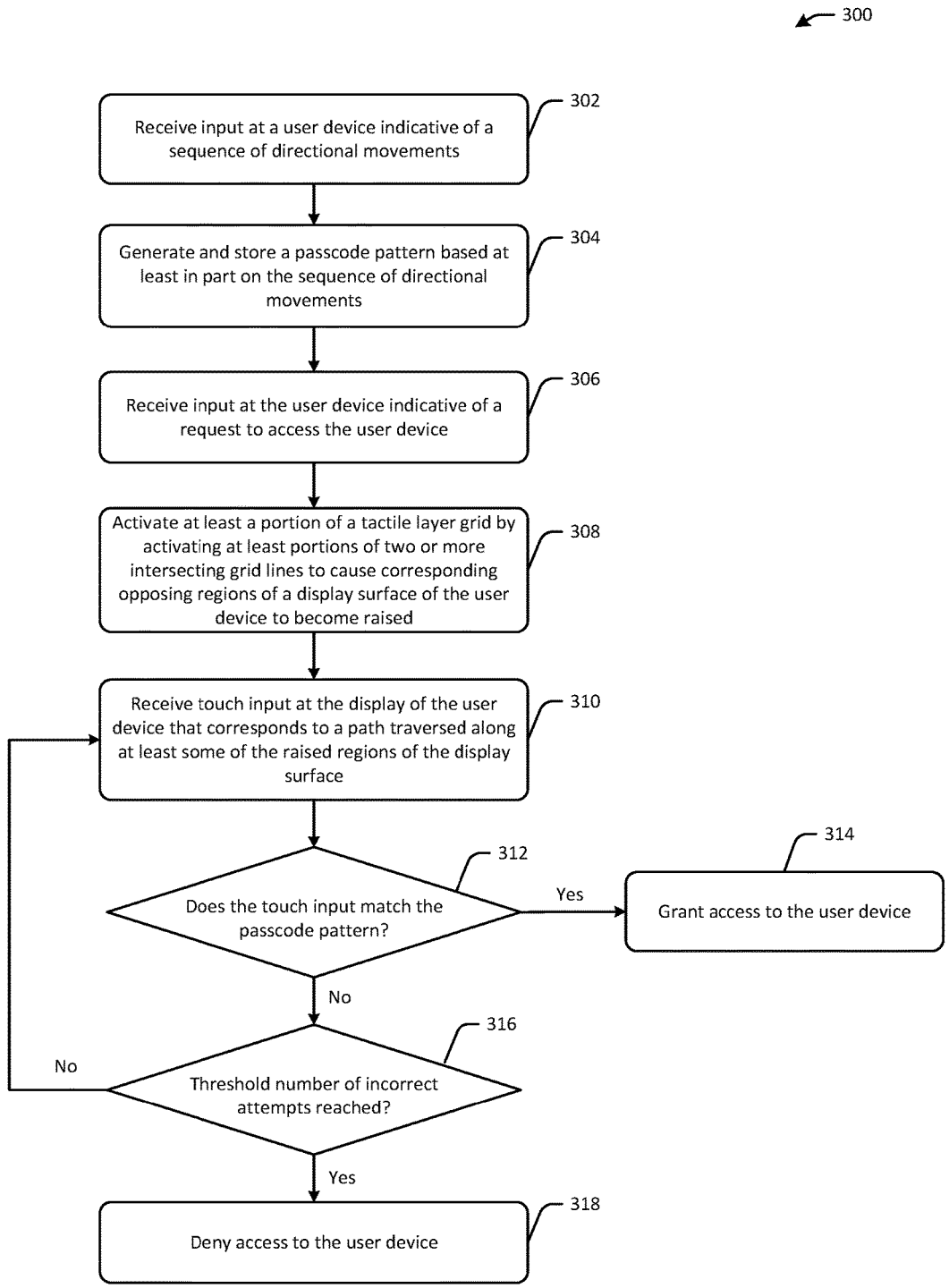
FIG. 3 is a process flow diagram of an illustrative method for authenticating access to a user device using a tactile-based mechanism in accordance with one or more example embodiments of the invention.

FIG. 1 is a schematic diagram that illustrates raised regions of a user device display surface that correspond to portions of a tactile layer grid. FIG. 2A is a schematic diagram that illustrates touch input provided to a user device that is representative of a correct sequence of tactile-based directional movements associated with a passcode pattern for authenticating access to the user device. FIG. 2B is a schematic diagram that illustrates touch input provided to a user device that is representative of an incorrect sequence of tactile-based directional movements that does not match a passcode pattern for authenticating access to the user device. FIG. 3 is a process flow diagram of an illustrative method 300 for authenticating access to a user device using a tactile-based mechanism. FIGS. 1, 2A-2B, and 3 will be described in conjunction with one another hereinafter.

Each operation of the method 300 may be performed by one or more components that may be implemented in any combination of hardware, software, and/or firmware. In certain example embodiments, one or more of these component(s) may be implemented, at least in part, as software and/or firmware that contains or is a collection of one or more program modules that include computer-executable instructions that when executed by a processing circuit cause one or more operations to be performed. A system or device described herein as being configured to implement example embodiments of the invention may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring first to FIG. 1, a user device 102 is depicted. The user device 102 may include a display 104. The user device 102 may be a smartphone, a tablet, a personal digital assistant, a personal computer, an electronic reader, or any other suitable electronic device capable of displaying digital content. The display 104 may be a liquid-crystal display (LCD), a light-emitting diode (LED) display, an organic electroluminescent (OLED) display, or the like. In certain example embodiments, the display 104 may include a touch-sensitive layer that enables receipt of touch input at the display 104.

The user device 102 may further include a tactile layer. The tactile layer may contain a tactile layer grid 106 of intersecting grid lines. The tactile layer may be disposed beneath the display layer 104 in the user device 102. The user device 102 may be configured to selectively activate portions of the tactile layer to cause opposing regions of a surface of the display layer 104 to become raised relative to other regions of the display surface. Selectively activating portions of the tactile layer may include activating two or more intersecting grid lines of the tactile layer grid 106 to cause regions of the display surface that coincide with the activated grid lines to become raised.

Referring now to FIG. 3, at block 302 of the method 300, computer-executable instructions of one or more tactile layer control modules residing on the user device 102 and/or on one or more remote servers may be executed to receive input at the user device 102 that is indicative of a sequence of directional movements. Subsequently, at block 304 of the method 300, computer-executable instructions of one or more passcode pattern generation modules residing on the user device and/or on one or more remote servers may be executed to generate and store a passcode pattern based at least in part on the sequence of directional movements.

More specifically, prior to receiving the input at block 302 of the method 300, the user device 102 may receive input (e.g., touch input, voice input, etc.) indicative of a user's desire to enter a passcode pattern to be used to authenticate future requests to access the user device 102. In response, computer-executable instructions of one or more tactile layer control modules residing on the user device 102 and/or on one or more remote servers may be executed to activate at least a portion of the tactile layer grid 106 to cause regions of the display surface that coincide with grid lines of the tactile layer grid 106 to become raised. In certain example embodiments, the entire tactile layer grid 106 may be activated to cause regions of the display surface that together correspond to all intersecting grid lines of the tactile layer grid 106 to become raised.

Subsequent to activation of all or some of the tactile layer grid 106, a user may provide touch input to the display 104 at block 302 of the method 300 that traverses a path along the raised regions of the display surface representative of the desired passcode pattern. The traversed path may include a sequence of directional movements that correspond to a unique traversal along the grid lines of a portion of the tactile layer grid 106. As previously noted, the directional movements may include a straight line movement, a directional left movement, a directional right movement, or the like. Further, as also previously noted, a straight line movement may require traversing past at least one intersection of grid lines of the tactile layer grid 106. For instance, assuming that a directional right or a directional left is taken at a particular grid line intersection, the path may be required to subsequently traverse past at least one grid line intersection in order to be interpreted as including a straight line movement. Further, in certain example embodiments, the traversal may cross itself at one or more locations.

The example tactile layer grid 106 is illustratively depicted in FIG. 1 as a rectangular grid in which grid lines intersect at right angles. However, it should be appreciated that the tactile layer grid 106 may have any suitable shape and arrangement of grid lines. For example, in certain example embodiments, the tactile layer grid 106 may have a spider web configuration; a configuration that includes a series of concentric circles linked via grid lines that intersect the concentric circles; or the like. Thus, it should be appreciated that, depending on the particular arrangement of the tactile layer grid 106, a directional right movement or a directional left movement may not necessarily correspond to a right angle directional change at an intersection, but rather may reflect a generally rightward or leftward movement along a raised region of the display surface that opposes a grid line of the tactile layer grid 106, where the grid line may have a curvature associated therewith.

Once the user traverses the path indicative of the desired passcode pattern, computer-executable instructions of the passcode pattern generation module(s) may be executed at block 304 of the method 300 to generate a passcode pattern based on the sequence of directional movements that make up the traversed path and store the passcode pattern locally on the user device 102 and/or on a remote server for use in authenticating subsequent access attempts.

Referring again to FIG. 3, at block 306 of the method 300, computer-executable instructions of one or more authentication modules residing on the user device 102 and/or on one or more remote servers may be executed to receive input at the user device 102 indicative of a request to access the user device 102. Upon receiving such input, computer-executable instructions of the tactile layer control module(s) may be executed to activate at least a portion of the tactile layer grid 106 by activating at least portions of two or more intersecting grid lines of the tactile layer grid 106 to cause corresponding opposing regions of the display surface to become raised.

FIG. 1 depicts an example combination of raised regions 108 of the display surface caused by selectively activating certain intersecting grid lines of the tactile layer grid 106. As previously described, the particular combination of grid lines that are activated may change for each access attempt, and thus, the particular arrangement of the raised regions 108 of the display surface may correspondingly change. As a result, the correct passcode pattern may be capable of being inputted despite potentially beginning entry at a different location each time device access is requested, thereby making unauthorized detection of the correct passcode pattern more difficult. Further, the correct passcode pattern may be undetectable from the raised regions 108 alone (even if the raised regions 108 are contacted by an unauthorized third party) because the raised regions 108 of the display surface may permit a touch-based traversal that corresponds to the correct passcode pattern as well as any number of incorrect traversals.

At block 310 of the method 300, the user device 102 may receive touch input at the display that corresponds to a path traversed along at least some of the raised regions of the display surface. Upon completion of the passcode pattern entry, the authentication module(s) may be executed to determine, at block 312 of the method 300, whether the entered passcode pattern matches the stored passcode pattern. In particular, the authentication module(s) may determine whether the sequence of directional movements present in the entered passcode matches the sequence of directional movements in the stored passcode.

More specifically, the user may initiate the touch input at block 312 by selecting a position on a raised region 108 of the display surface to initiate entry of the passcode pattern. The user may then traverse a path along the raised regions 108 of the display surface that includes a sequence of directional movements. In certain example embodiments, the path traversed by the user along the raised regions 108 of the display surface may be illuminated in real-time or near real-time or identified using some other indicia to provide an indication to the user of those portions of the raised regions 108 that have been traversed up to a given point in the traversal. In addition, in certain example embodiments, visual elements may be added to the display 104 that appear to a third party as being part of the raised regions 108 even though such visual elements are not raised. For example, visual indicia corresponding to portions of the tactile layer grid 106 that are not activated, and thus not associated with the raised regions 108 of the display surface, may be rendered on the display 104 so as to obfuscate which portions of the tactile layer grid 106 correspond to the raised regions 108 and which portions do not.

FIG. 2A illustrates touch input provided to the user device 102 that is representative of a correct sequence of tactile-based directional movements associated with a passcode pattern that authenticates access to the user device 102. In contrast, FIG. 2B illustrates touch input provided to the user device 102 that is representative of an incorrect sequence of tactile-based directional movements that does not match the passcode pattern. For ease of explanation, the same arrangement of raised regions 108 of the display 104 is depicted in FIGS. 2A-2B as is depicted in FIG. 1. It should be appreciated, however, that different grid lines of the tactile layer grid 106 may be activated each time access to the user device 102 is requested, thereby causing a different configuration of regions of the display surface to become raised. Further, for ease of depiction, only a portion 202 of the entire tactile layer grid 106 is depicted.

FIG. 2A depicts a traversal path along the raised regions 108 of the display surface that corresponds to the correct passcode pattern, whereas FIG. 2B depicts a traversal path along the raised regions 108 of the display surface that corresponds to an incorrect passcode pattern 206. In the example scenario depicted in FIGS. 2A-2B, the correct passcode pattern may include the following sequence of directional movements: straight, right, straight, right. As previously noted, the raised regions 108 of the display surface may include raised intersections that correspond to intersections of grid lines in the tactile layer grid 106. At each such raised intersection, the user may be required to make a decision as to whether to make a straight line movement through the raised intersection, a left directional movement, or a right directional movement. Each such raised intersection may allow for the correct directional movement as well as any number of incorrect directional movements. For example, the correct directional movement at a raised intersection may be a left directional movement, but the raised regions of the display surface may also allow for a straight line directional movement, a right directional movement, and/or a reverse directional movement. The combination of the decisions made at each such raised intersection may determine whether the passcode being entered matches the previously generated passcode.

In certain example embodiments, if an incorrect directional movement is made at a raised intersection, the corresponding entered passcode pattern may be determined to not match the correct stored passcode pattern. For example, if a left directional movement is made at a raised intersection when a right directional movement is supposed to be made, the entered passcode pattern may be incorrect. Further, even if the correct sequence of directional movements appears to be made based on visual inspection, it may not correspond to the correct passcode pattern, thus making visual detection of the passcode pattern difficult. For example, the incorrect passcode pattern 206 traversed in FIG. 2B may initially visually appear to include the sequence of directional movements associated with the correct passcode pattern 204 (straight, right, straight, right). However, the pattern 206 may be incorrect based on how a straight line directional movement is defined. As previously noted, a straight line directional movement may require traversing at least one grid intersection. Moreover, in order for a straight line directional movement in the entered passcode to be deemed a match to a straight line directional movement in the stored passcode, a number of traversed intersections in the entered passcode may be required to exactly match the number of traversed intersections in the stored passcode.

As depicted in FIG. 2A, the initial directional movement from the starting point traverses at least one raised intersection, and thus, may be deemed a straight line movement. In contrast, the initial directional movement from the starting point in FIG. 2B does not traverse at least one raised intersection (a right directional movement is made at the first raised intersection that is reached), and thus, that initial directional movement may not be considered a straight line movement. Therefore, although the path traversal corresponding to the incorrect passcode pattern 206 appears to initially include a straight line movement, the authentication module(s) may not interpret it as a straight line movement. Instead, the path traversal corresponding to the incorrect passcode pattern 206 may be determined to begin with a right directional movement. In addition, straight line directional movements present in the entered passcode pattern and the stored passcode pattern may be required to traverse an equal number of raised intersections. For example, as shown in FIGS. 2A-2B, a straight line directional movement in the path traversal corresponding to the incorrect passcode pattern 206 traverses two raised intersections, whereas the corresponding straight line directional movement in the path traversal corresponding to the correct passcode pattern 204 traverses only one raised intersection. As such, the authentication module(s) may determine that these straight line directional movements are not equivalent, and thus, may determine that the path traversal in FIG. 2B does not correspond to the correct passcode pattern 204.

If a match is determined to exist at block 312 of the method 300, access to the user device 102 may be granted at block 314 of the method 300. Alternatively, if the entered passcode does not match the stored passcode, access to the user device 102 may be denied at block 318. Optionally, in certain example embodiments, in response to a negative determination at block 312, a determination may be made, at block 316 of the method 300, as to whether a threshold number of incorrect passcode entry attempts have been reached. In response to a positive determination at block 316, the method 300 may proceed to block 318 where access to the user device 102 is denied. Alternatively, in response to a negative determination at block 316, the method 300 may again proceed to block 310 to allow the user to once again attempt entry of the correct passcode pattern 204.

In certain example embodiments, an exact match may be required for access to be granted. That is, the particular sequence of directional movements in the entered passcode may be required to exactly match the sequence of directional movements in the stored passcode. For example, if the correct passcode pattern 204 is straight, right, straight, right as depicted in FIG. 2A, then the entered passcode may be deemed a match if it contains the exact same sequence of directional movements and the straight line directional movements in the entered passcode traverse the same number of raised intersections as corresponding straight line directional movements in the stored correct passcode pattern 204. In other example embodiments, the number of raised intersections traversed during a straight line directional movement may be ignored, and only the order of the changes in direction may be used to represent the correct passcode pattern and determine whether an entered passcode pattern matches the stored correct passcode pattern.

In other example embodiments, a certain amount of deviation between the entered passcode and the stored passcode may be permitted for granting access to the user device 102. For example, if a number of directional movement mismatches between the sequence of directional movements in the stored passcode and the sequence of directional movements in the entered passcode does not exceed a threshold value, access to the user device 102 may be granted. In other example embodiments, in addition to or as an alternative to providing a tolerance for directional movement mismatches, the user may be permitted to correct mistakes in passcode entry up to some maximum number of times. The user may correct a passcode entry mistake by reversing course along the path being traversed until a grid intersection is reached at which position the user may make a different directional movement than what was previously made. In certain example embodiments, the user may first provide input to the user device indicating a desire to correct a mistake prior to reversing course so as to prevent the user device from interpreting the directional reversal as a continuation of the path being traversed.

In addition, in certain example embodiments, different passcode patterns may be specified for different levels of access. For example, a simpler passcode pattern that includes a lesser number of directional movements may be specified for a lower level of access (e.g., access to only the camera application), whereas a more complex passcode pattern that includes a greater number of directional movements (or a more complex traversal path that, for example, crosses itself multiple times) may be specified for a higher level of access (e.g., access to all device functionality).

Further, in certain example embodiments, the tactile feedback provided to the user to guide passcode pattern entry may be provided by means other activating portions of the tactile layer grid 106. For example, micro-vibrations of portions of the display 104 may be used in addition to, or in lieu of, the raised regions 108. The micro-vibrations may vary in frequency and/or intensity and may provide a tactile output that the use perceives as a raised surface.

One or more illustrative embodiments of the invention are described herein. Such embodiments are merely illustrative of the scope of this invention and are not intended to be limiting in any way. Accordingly, variations, modifications, and equivalents of embodiments disclosed herein are also within the scope of this invention.

Figure 4:
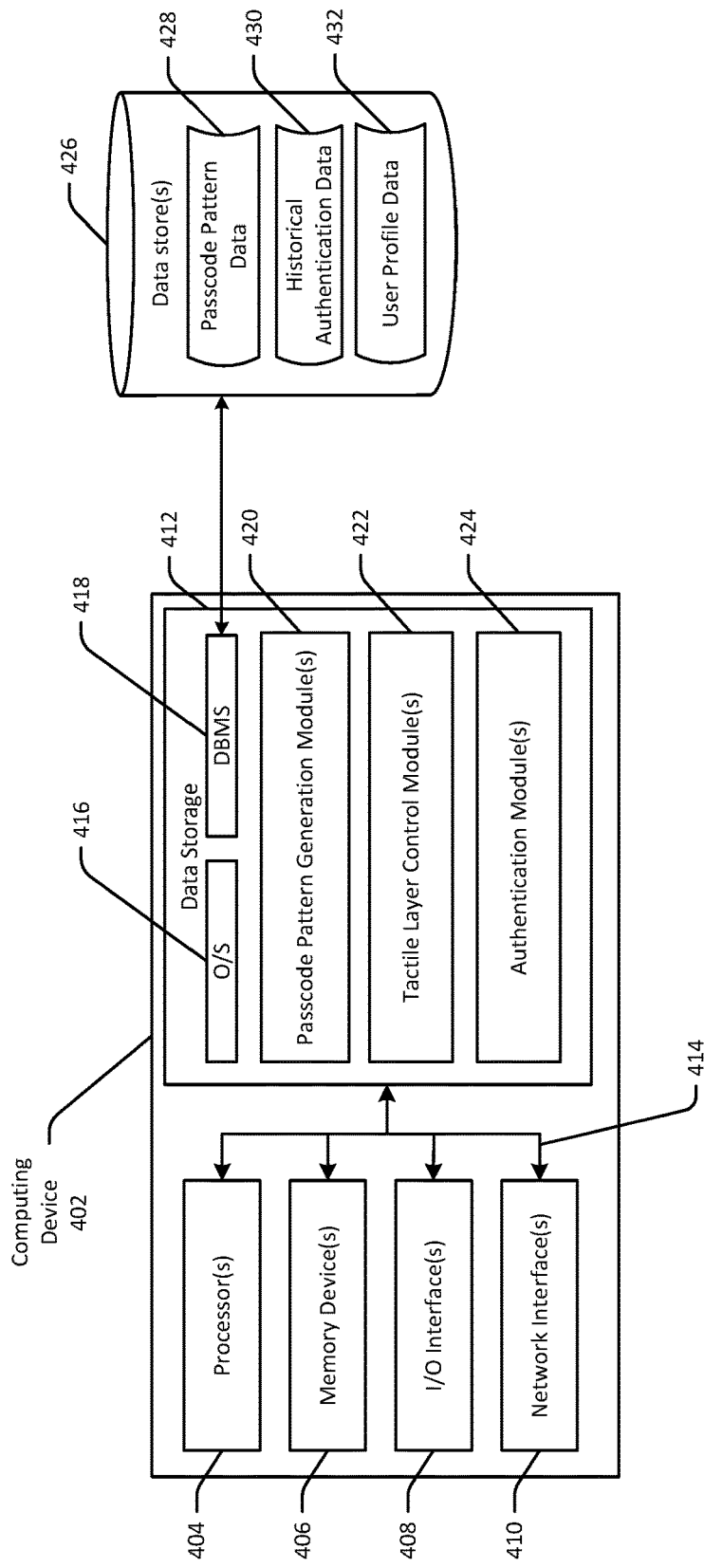
FIG. 4 is a schematic diagram of an illustrative computing device configured to implement one or more example embodiments of the invention.

FIG. 4 is a schematic diagram of an illustrative computing device 402 configured to implement one or more example embodiments of the invention. The computing device 402 may represent an illustrative configuration of the user device 102. While tactile-based passcode pattern entry functionality described herein may be described in connection with the illustrative computing device 402, it should be described that any such functionality may be implemented, at least in part, by one or more remote servers communicatively coupled to the computing device 402 over one or more networks such that the functionality is executed in a distributed manner.

In an illustrative configuration, the computing device 402 may include one or more processors (processor(s)) 404, one or more memory devices 406 (generically referred to herein as memory 406), one or more input/output ("I/O") interface(s) 408, one or more network interfaces 410, and data storage 412. The computing device 402 may further include one or more buses 414 that functionally couple various components of the computing device 402.

The bus(es) 414 may include at least one of a system bus, a memory bus, an address bus, or a message bus, and may permit the exchange of information (e.g., data (including computer-executable code), signaling, etc.) between various components of the computing device 402. The bus(es) 414 may include, without limitation, a memory bus or a memory controller, a peripheral bus, an accelerated graphics port, and so forth. The bus(es) 414 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 406 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 406 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 406 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 412 may include removable storage and/or non-removable storage including, but not limited to, magnetic storage, optical disk storage, and/or tape storage. The data storage 412 may provide non-volatile storage of computer-executable instructions and other data. The memory 406 and the data storage 412, removable and/or non-removable, are examples of computer-readable storage media (CRSM) as that term is used herein.

The data storage 412 may store computer-executable code, instructions, or the like that may be loadable into the memory 406 and executable by the processor(s) 404 to cause the processor(s) 404 to perform or initiate various operations. The data storage 412 may additionally store data that may be copied to memory 406 for use by the processor(s) 404 during the execution of the computer-executable instructions. Moreover, output data generated as a result of execution of the computer-executable instructions by the processor(s) 404 may be stored initially in memory 406 and may ultimately be copied to data storage 412 for non-volatile storage.

More specifically, the data storage 412 may store one or more operating systems (O/S) 416; one or more database management systems (DBMS) 418 configured to access the memory 406 and/or one or more data store(s) 426; and one or more program modules, applications, engines, computer-executable code, scripts, or the like such as, for example, one or more passcode pattern generation modules 420, one or more tactile layer control modules 422, and one or more authentication modules 424. Any of the components depicted as being stored in data storage 412 may include any combination of software, firmware, and/or hardware. The software and/or firmware may include computer-executable instructions (e.g., computer-executable program code) that may be loaded into the memory 406 for execution by one or more of the processor(s) 404 to perform any of the operations described earlier in connection with similarly named program modules.

Although not depicted in FIG. 4, the data storage 412 may further store various types of data utilized by components of the computing device 402 (e.g., passcode pattern data 428, historical authentication data 430, user profile data 432, etc.). The passcode pattern data 428 may include data indicative of a sequence of directional movements associated with a stored passcode pattern used to authenticate access to the computing device 402. The historical authentication data 430 may include data indicative of a number of incorrect passcode entry attempts, data indicative of incorrect path traversals that were previously attempted, etc. The user profile data 432 may include data indicative of the number of incorrect passcode entry attempts permitted for a particular user profile and/or access level (which may differ across profiles/access levels); the number of directional corrections permitted for a particular user profile and/or access level; etc. Any data stored in the data storage 412 may be loaded into the memory 406 for use by the processor(s) 404 in executing computer-executable instructions. In addition, any data stored in the data storage 412 may potentially be stored in the data store(s) 426 and may be accessed via the DBMS 418 and loaded in the memory 406 for use by the processor(s) 404 in executing computer-executable instructions.

The processor(s) 404 may be configured to access the memory 406 and execute computer-executable instructions loaded therein. For example, the processor(s) 404 may be configured to execute computer-executable instructions of the various program modules, applications, engines, or the like of the computing device 402 to cause or facilitate various operations to be performed in accordance with one or more embodiments of the invention. The processor(s) 404 may include any suitable processing unit capable of accepting data as input, processing the input data in accordance with stored computer-executable instructions, and generating output data. The processor(s) 404 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 404 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 404 may be capable of supporting any of a variety of instruction sets.

Referring now to other illustrative components depicted as being stored in the data storage 412, the O/S 416 may be loaded from the data storage 412 into the memory 406 and may provide an interface between other application software executing on the computing device 402 and hardware resources of the computing device 402. More specifically, the O/S 416 may include a set of computer-executable instructions for managing hardware resources of the computing device 402 and for providing common services to other application programs. In certain example embodiments, the O/S 416 may include or otherwise control execution of one or more of the program modules depicted as being stored in the data storage 412. The O/S 416 may include any operating system now known or which may be developed in the future including, but not limited to, any server operating system, any mainframe operating system, or any other proprietary or non-proprietary operating system.

The DBMS 418 may be loaded into the memory 406 and may support functionality for accessing, retrieving, storing, and/or manipulating data stored in the memory 406, data stored in the data storage 412, and/or data stored in the data store(s) 426. The DBMS 418 may use any of a variety of database models (e.g., relational model, object model, etc.) and may support any of a variety of query languages. The DBMS 418 may access data represented in one or more data schemas and stored in any suitable data repository. The data store(s) 426 that may be accessible by the computing device 402 via the DBMS 418 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 402, the input/output (I/O) interface(s) 408 may facilitate the receipt of input information by the computing device 402 from one or more I/O devices as well as the output of information from the computing device 402 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 402 or may be separate. The I/O devices may further include, for example, any number of peripheral devices such as data storage devices, printing devices, and so forth.

The I/O interface(s) 408 may also include an interface for an external peripheral device connection such as universal serial bus (USB), FireWire, Thunderbolt, Ethernet port or other connection protocol that may connect to one or more networks. The I/O interface(s) 408 may also include a connection to one or more antennas to connect to one or more of the network(s) 1106 via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 402 may further include one or more network interfaces 410 via which the computing device 402 may communicate with any of a variety of other systems, platforms, networks, devices, and so forth. The network interface(s) 410 may enable communication via one or more networks which may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules depicted in FIG. 4 as being stored in the data storage 412 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 402 and/or hosted on other computing device(s) (e.g., one or more remote servers) accessible via one or more networks, may be provided to support functionality provided by the modules depicted in FIG. 4 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of servers in the computing device 402 in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the computing device 402 may include alternate and/or additional hardware, software, or firmware components beyond those described or depicted without departing from the scope of the invention. More particularly, it should be appreciated that software, firmware, or hardware components depicted as forming part of the computing device 402 are merely illustrative and that some components may not be present or additional components may be provided in various embodiments. While various illustrative modules have been depicted and described as software modules stored in data storage 412, it should be appreciated that functionality described as being supported by such modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 300 may be performed by a computing device 402 having the illustrative configuration depicted in FIG. 4, or more specifically, by one or more program modules, engines, applications, or the like executing on such a device. It should be appreciated, however, that such operations may be implemented in connection with numerous other device configurations including in a distributed manner with one or more remote servers.

The operations described and depicted in the illustrative method of FIG. 3 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIG. 3 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for authenticating access to a user device, the method comprising:
   receiving input at the user device indicative of a request to access the user device;
   providing a tactile output at one or more regions of a surface of a display of the user device, wherein providing the tactile output comprises activating two or more intersecting grid lines of a tactile layer grid of a tactile layer of the user device to cause the one or more regions of the surface of the display that oppose the two or more intersecting grid lines to become raised in relation to a remainder of the surface of the display;
   receiving touch input at the display of the user device, wherein the touch input comprises a path traversed along the surface of the display that is determined at least in part by at least a portion of the one or more regions of the display at which the tactile output is provided, wherein the path traversed along the surface of the display coincides with at least a portion of the two or more intersecting grid lines;
   determining that the touch input matches a stored passcode pattern at least in part by:
      determining a first sequence of directional movements associated with the stored passcode pattern, wherein the first sequence of directional movements comprises an indication of a number of intersections of the tactile layer grid required to be traversed for each straight line movement in the first sequence of directional movements;
      determining a second sequence of directional movements associated with the path traversed along the surface of the display; and
      determining that the second sequence of directional movements matches the first sequence of directional movements, wherein determining that the second sequence of directional movements matches the first sequence of directional movements comprises:
         determining a number of directional deviations between the second sequence of directional movements and the first sequence of directional movements; and
         determining that the number of directional deviations satisfies a threshold value; and
   authenticating and granting access to the user device based at least in part on the touch input matching the stored passcode pattern.

2. The computer-implemented method of claim 1, wherein the request is a first request, the tactile output is first tactile output, the one or more regions are a first one or more regions, the touch input is first touch input, and the path is a first path, the method further comprising:
   receiving input at the user device indicative of a second request to access the user device;
   providing a second tactile output at a second one or more regions of a surface of a display of the user device;
   receiving second touch input at the display of the user device, wherein the second touch input comprises a second path traversed along the surface of the display that coincides with at least a portion of the second one or more regions of the display at which the second tactile output is provided;
   determining that the second touch input does not match the stored passcode pattern; and
   denying access to the user device,
   wherein determining that the second touch input does not match the stored passcode pattern comprises:
      determining a third sequence of directional movements associated with the second path traversed along the surface of the display; and
      determining at least one of: i) that a straight line movement in the second sequence of directional movements traverses a lesser or greater number of the intersections of the tactile layer grid than a straight line movement in the first sequence of directional movements or ii) that the second sequence of directional movements comprises a different ordering of directional movements than the first sequence of directional movements.

3. A system for authenticating access to a user device, the system comprising:
   at least one memory storing computer-executable instructions; and
   at least one processor configured to access the at least one memory and execute the computer-executable instructions to:
      receive input at the user device indicative of a request to access the user device;
      provide a tactile output at one or more regions of a surface of a display of the user device, wherein the at least one processor is configured to provide the tactile output by executing the computer-executable instructions to activate two or more intersecting grid lines of a tactile layer grid of a tactile layer of the user device to cause the one or more regions of the surface of the display that oppose the two or more intersecting grid lines to become raised in relation to a remainder of the surface of the display;
      receive touch input at the display of the user device, wherein the touch input comprises a path traversed along the surface of the display that is determined at least in part by at least a portion of the one or more regions of the display at which the tactile output is provided wherein the path traversed along the surface of the display coincides with at least a portion of the two or more intersecting grid lines;
      determine that the touch input matches a stored passcode pattern, wherein the at least one processor is configured to determine that the touch input matches the stored passcode pattern by executing the computer-executable instructions to:
         determine a first sequence of directional movements associated with the stored passcode pattern, wherein the first sequence of directional movements comprises an indication of a number of intersections of the tactile layer grid required to be traversed for each straight line movement in the first sequence of directional movements;
         determine a second sequence of directional movements associated with the path traversed along the surface of the display; and determine that the second sequence of directional movements matches the first sequence of directional movements, wherein the at least one processor is configure to determine that the second sequence of directional movements matches the first sequence of directional movements by executing the computer-executable instructions to:
    determine a number of directional deviations between the second sequence of directional movements and the first sequence of directional movements; and
    determine that the number of directional deviations satisfies a threshold value; and
authenticate and grant access to the user device based at least in part on the touch input matching the stored passcode pattern.

4. The system of claim 3, wherein the request is a first request, the tactile output is first tactile output, the one or more regions are a first one or more regions, the touch input is first touch input, and the path is a first path, and wherein the at least one processor is further configured to execute the computer-executable instructions to:
    receive input at the user device indicative of a second request to access the user device;
    provide a second tactile output at a second one or more regions of a surface of a display of the user device;
    receive second touch input at the display of the user device, wherein the second touch input comprises a second path traversed along the surface of the display that coincides with at least a portion of the second one or more regions of the display at which the second tactile output is provided;
    determine that the second touch input does not match the stored passcode pattern; and
    deny access to the user device,
    wherein the at least one processor is configured to determine that the second touch input does not match the stored passcode pattern by executing the computer-executable instructions to:
        determine a third sequence of directional movements associated with the second path traversed along the surface of the display; and
        determine at least one of: i) that a straight line movement in the second sequence of directional movements traverses a lesser or greater number of the intersections of the tactile layer grid than a straight line movement in the first sequence of directional movements or ii) that the second sequence of directional movements comprises a different ordering of directional movements than the first sequence of directional movements.

5. A computer program product for authenticating access to a user device, the computer program product comprising a non-transitory storage medium readable by a processing circuit, the storage medium storing instructions executable by the processing circuit to cause a method to be performed, the method comprising:
    receiving input at the user device indicative of a request to access the user device;
    providing a tactile output at one or more regions of a surface of a display of the user device, wherein providing the tactile output comprises activating two or more intersecting grid lines of a tactile layer grid of a tactile layer of the user device to cause the one or more regions of the surface of the display that oppose the two or more intersecting grid lines to become raised in relation to a remainder of the surface of the display;
    receiving touch input at the display of the user device, wherein the touch input comprises a path traversed along the surface of the display that is determined at least in part by at least a portion of the one or more regions of the display at which the tactile output is provided, wherein the path traversed along the surface of the display coincides with at least a portion of the two or more intersecting grid lines;
    determining that the touch input matches a stored passcode pattern at least in part by:
        determining a first sequence of directional movements associated with the stored passcode pattern, wherein the first sequence of directional movements comprises an indication of a number of intersections of the tactile layer grid required to be traversed for each straight line movement in the first sequence of directional movements;
        determining a second sequence of directional movements associated with the path traversed along the surface of the display; and
        determining that the second sequence of directional movements matches the first sequence of directional movements, wherein determining that the second sequence of directional movements matches the first sequence of directional movements comprises:
            determining a number of directional deviations between the second sequence of directional movements and the first sequence of directional movements; and
            determining that the number of directional deviations satisfies a threshold value; and
    authenticating and granting access to the user device based at least in part on the touch input matching the stored passcode pattern.

6. The computer program product of claim 5, wherein the request is a first request, the tactile output is first tactile output, the one or more regions are a first one or more regions, the touch input is first touch input, and the path is a first path, the method further comprising:
    receiving input at the user device indicative of a second request to access the user device;
    providing a second tactile output at a second one or more regions of a surface of a display of the user device;
    receiving second touch input at the display of the user device, wherein the second touch input comprises a second path traversed along the surface of the display that coincides with at least a portion of the second one or more regions of the display at which the second tactile output is provided;
    determining that the second touch input does not match the stored passcode pattern; and
    denying access to the user device,
    wherein determining that the second touch input does not match the stored passcode pattern comprises:
        determining a third sequence of directional movements associated with the second path traversed along the surface of the display; and
        determining at least one of: i) that a straight line movement in the second sequence of directional movements traverses a lesser or greater number of the intersections of the tactile layer grid than a straight line movement in the first sequence of directional movements or ii) that the second sequence of directional movements comprises a different ordering of directional movements than the first sequence of directional movements.

\* \* \* \* \*